United States Patent [19]

Nishimura

[11] Patent Number: 4,793,213
[45] Date of Patent: Dec. 27, 1988

[54] COMPACT TRANSMISSION APPARATUS FOR A VEHICLE

[75] Inventor: Sadanori Nishimura, Omiya, Japan

[73] Assignee: Honda Giken Kogyo Kabushiki Kaisha, Tokyo, Japan

[21] Appl. No.: 377,907

[22] Filed: May 13, 1982

[30] Foreign Application Priority Data

May 14, 1981 [JP] Japan .................................. 56-71380

[51] Int. Cl.⁴ .......................................... F16H 47/06
[52] U.S. Cl. ...................................... 74/730; 74/335; 74/606 R
[58] Field of Search ......................... 74/377, 325–333, 74/334, 359, 360, 606 R, 329, 332, 730, 335

[56] References Cited

U.S. PATENT DOCUMENTS

| | | | |
|---|---|---|---|
| 2,464,538 | 3/1949 | Vanderzee | 192/87 |
| 2,536,737 | 1/1951 | Gerst | 74/730 |
| 2,943,503 | 7/1960 | Forster | 74/359 |
| 3,017,006 | 1/1962 | Dence et al. | 192/113 |
| 3,098,549 | 7/1963 | Schick | 192/87 |
| 3,319,479 | 5/1967 | Iavelli et al. | 74/335 X |
| 3,578,760 | 5/1971 | Shinmura | 74/606 R X |
| 3,952,606 | 4/1976 | Schulz | 74/377 |
| 4,094,206 | 6/1978 | Sogo et al. | 74/335 X |
| 4,138,006 | 2/1979 | Benson, Jr. | 74/377 X |
| 4,165,657 | 8/1979 | Bednar | 74/329 |
| 4,290,513 | 9/1981 | Nishimura | 192/3.22 |
| 4,304,155 | 12/1981 | Want et al. | 74/336 R |
| 4,403,526 | 9/1983 | Numazawa et al. | 74/740 |
| 4,416,168 | 11/1983 | Arai et al. | 74/740 |

FOREIGN PATENT DOCUMENTS 54-103958  8/1979  Japan .
2030246  3/1980  United Kingdom ............. 74/606 R Primary Examiner—Leslie A. Braun
Assistant Examiner—Dwight G. Diehl
Attorney, Agent, or Firm—Armstrong, Nikaido, Marmelstein & Kubovcik

[57] ABSTRACT

A compact transmission apparatus for a vehicle of the type wherein an input shaft and an output shaft are provided in parallel in a casing with the shaft supported at a middle wall and the front wall of the casing. Various speed driving trains are provided in the order from front to rear of third speed, second speed, fourth speed, reverse and first speed. The second speed driving train utilizes a front clutch mechanism of a double-type clutch, while the fourth speed driving train uses the rear clutch mechanism of the double-type clutch. The driving gear of the reverse driving train is made integral with the driving gear of the fourth speed driving train. A selection mechanism is provided between the driven gears of the reverse driving train and the fourth speed driving train to select for forward, highest speed movement or reverse movement.

3 Claims, 3 Drawing Sheets

COMPACT TRANSMISSION APPARATUS FOR A VEHICLE

BACKGROUND OF THE INVENTION

1. Field of the Invention

This invention relates to a transmission apparatus for a vehicle and, more specifically, to a compact transmission which is advantageous especially in a front-engine, front-drive motorcar where the size of the transmission is largely restricted with relation to the space available.

2. Description of the Prior Art

There has been hitherto described in Japanese Patent Unexamined Publication Sho No. 54-103958 and Japanese Patent Unexamined Publication Sho No. 55-51160, a transmission for a front-drive motorcar having three forward speeds and reverse. An input shaft and an output shaft are provided in parallel one with another in a transmission casing and are supported rotatably on a front wall and a middle wall of the casing. A first-speed driving train for a low speed is provided positioned to the rear of the middle wall. A second-speed driving train for a middle speed is provided at a middle position. A third-speed driving train for a high speed is provided on a front side on the second-speed driving train and a reverse driving train is provided on a rear side thereof. The second-speed, third-speed and reverse driving trains are disposed between the middle wall and the front wall of the casing.

This type of apparatus is advantageous in that the shafts can be made small in diameter because the first-speed driving train and the reverse driving train, which have a large bending force acting on the shafts, are disposed near the middle wall and in front and rear thereof.

Additionally, this type of apparatus is arranged so that the second-speed clutch for the second-speed driving train provided on the input shaft may be used also for a clutch for the reverse driving train. The reverse driving gear for the reverse driving train is integrally connected to the second-speed driving gear on the output side of the second-speed clutch. The second-speed driven gear and a reverse driven gear which are meshed with the respective driving gears are arranged to be selectively engaged with the output shaft through a selection mechanism provided between the two driven gears. In this manner, a clutch to be exclusively used for driving in reverse is omitted so that the axial dimension of the transmission apparatus can be shortened by that extent.

It is possible in this arrangement to add a fourth-speed driving train in order to increase the number of speed stages. However, if the fourth-speed driving train is simply added thereto, the axial size or dimension of the apparatus becomes too long.

Further, the simple addition of a fourth-speed driving train to the above-known apparatus would generate certain further problems. When the vehicle is being driven forward in the fourth or highest driving speed, the second-speed driven gear is connected by the selection mechanism to the output shaft. Since the second-speed driving gear is always meshed with the second-speed driven gear, the second-speed driving gear is also rotated. Since the normal gear ratio between the second-speed driving gear and the second-speed driven gear is a reduction ratio, that is, the driven gear moves at a rotational speed slower than the driving gear, at the time of high speed rotation of the output shaft by the fourth-speed driving train, the second-speed driven gear rotates the second-speed driving gear at a higher rotational speed than that of the output shaft. Since the reverse driving gear is integral with the second speed driving gear, the reverse driving train including an idler gear between the driving gear and the driven gear is given a high speed rotation. This generates a large amount of gear noise by the various engaged gears at the time of high speed rotation thereof by the fourth speed driving train. Additionally, when these gears are meshed in lubricating oil, a large power loss results caused by the resistance to agitation by the lubricating oil.

OBJECTS AND SUMMARY OF THE INVENTION

It is a primary object of the present invention to provide a compact transmission apparatus for a vehicle having four forward speeds and a reverse speed.

It is a further object of the present invention to provide a transmission apparatus which is compact and does not generate a large amount of noise when in a high-speed forward drive condition.

It is yet a further object of the present invention to provide a compact transmission having four forward speeds and a reverse speed, which is efficient to operate because of minimum power loss due to agitation of a lubricating oil.

These and other objects which will be readily apparent to a person of ordinary skill in the art are obtained in a transmission apparatus including a casing having a front end defined by a front wall, a rear end defined by a rear wall and a middle wall dividing an interior of the casing into a forward portion and a rearward portion. An input shaft extends longitudinally through the casing from the front wall towards the rear wall. An output shaft extends longitudinally from the front wall towards the rear wall in parallel with the input shaft. Both the output shaft and the input shaft are rotatably supported on the front wall and the middle wall. A first-speed driving train for a low speed of the vehicle is provided on the input and output shafts in the rearward portion of the casing between the middle wall and the rear wall. A second-speed driving train for a middle speed of the vehicle is provided on the input shaft and the output shaft in the forward portion of the casing. The second-speed driving train includes a second-speed clutch on the input shaft. A third-speed driving train for a high speed of the vehicle is provided on the input and output shafts in the forward portion, forwardly of and adjacent to the second-speed driving train. A fourth-speed driving train for a highest speed of the vehicle is provided on the input and output shafts in the forward portion rearwardly of and adjacent to the second-speed driving train.

The fourth-speed driving train includes the fourth-speed clutch on the input shaft, a fourth-speed driving gear on the input shaft coupled to the fourth-speed clutch, and a fourth-speed driven gear rotatably supported on the output shaft and meshed with the fourth-speed driving gear. The fourth-speed clutch is constituted by a rearward clutch mechanism of a double-type clutch. The second speed clutch is constituted by a forward clutch mechanism of the double type clutch. A reverse driving train for a reverse speed of the vehicle is provided on the input and output shafts in the forward portion between the fourth-speed driving train and the middle wall. The reverse driving train includes a reverse driving gear on the input shaft integrally connected to the fourth-speed driving gear on an output side of the fourth-speed clutch, an idler gear meshed with the reverse driving gear and a reverse driven gear rotatably supported on the output shaft adjacent the fourth-speed driven gear. The reverse driven gear is meshed with the idler gear. A selection means is fixed to the output shaft between the fourth-speed driven gear and the reverse driven gear for, selectively coupling one at a time of the fourth-speed driven gear and the reverse driven gear to the output shaft.

The transmission can further comprise a torque converter and a direct coupling clutch provided forwardly of the front wall and operatively coupled to the input shaft.

An oil supply means can also be provided mounted on the front wall in the forward portion of the casing. The input shaft can be provided in a forward end and a rearward end thereof, with a pair of bores for supplying oil directly to the double-type clutch.

DETAILED DESCRIPTION OF A PREFERRED EMBODIMENT

Figure 1:
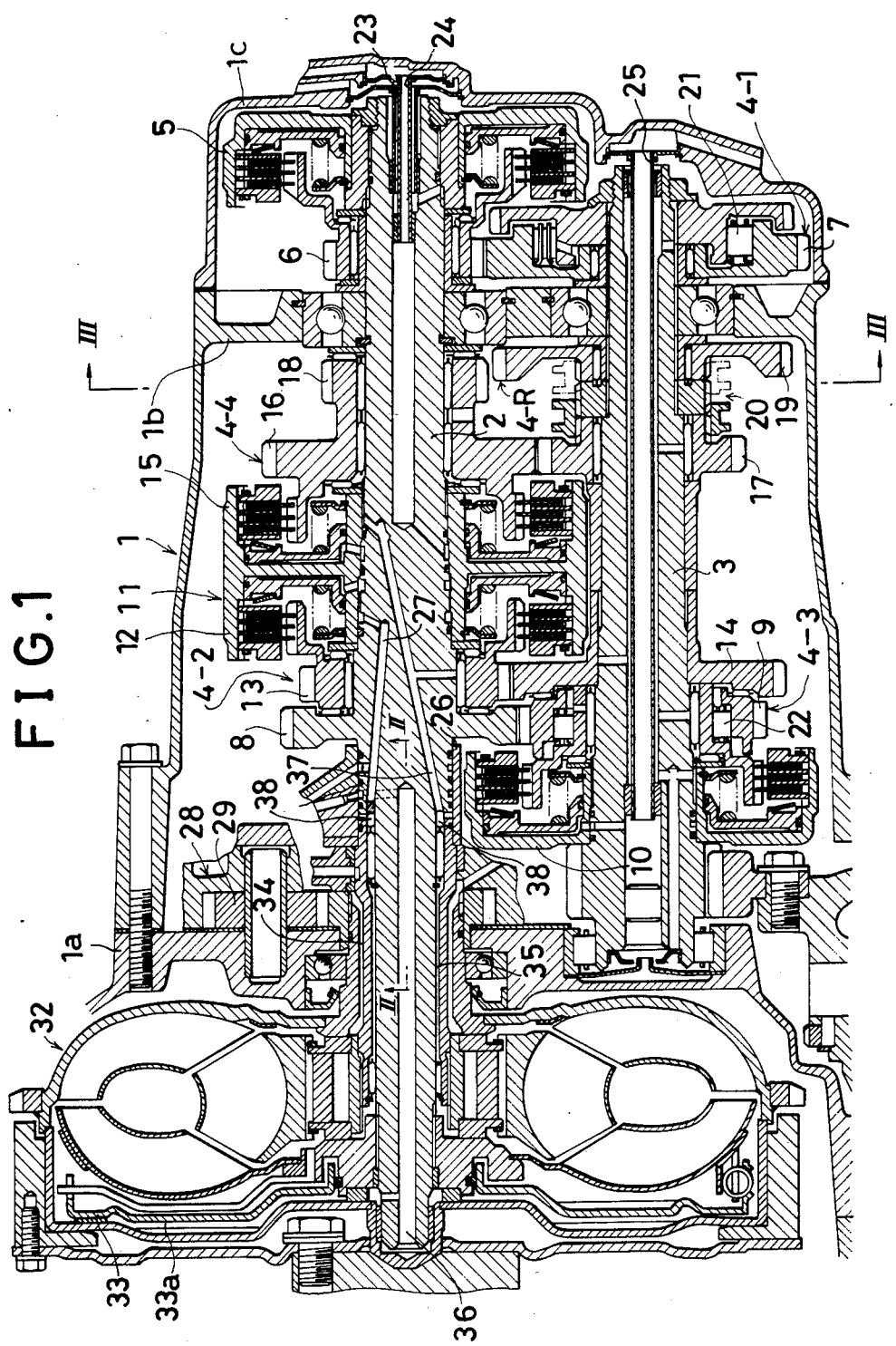
FIG. 1 is a secitonal side view of one embodiment of the present invention.

The above and other objects and the attendant advantages of the present invention will become readily apparent by reference to the following detailed description when considered in conjunction with the accompanying drawings.

Referring to the drawings, a transmission casing 1 has a front wall 1a, a middle wall 1b and a rear wall 1c. An input shaft 2 and an output shaft 3 are provided in parallel, one with another, in the casing 1 so as to be supported rotatably on the front wall 1a and the middle wall 1b of the casing 1. The input shaft 2 is connected to an internal combustion engine and the output shaft 3 is connected to driving wheels of a vehicle. Between the two shafts 2,3, a first-speed driving train 4-1 for a low speed is provided so as to be positioned to the rear of the middle wall 1b. A second-speed driving train 4-2 for a middle speed is provided at a middle position. A third-speed driving train 4-3 for a high speed is provided on a forward side of the second-speed drive train, and reverse driving train 4-R is provided on a rear side thereof so as to be disposed between the middle wall 1b and the front wall 1a. Additionally, a fourth-speed driving train 4—4 for the highest speed is provided so as to be positioned between the second speed driving train 4-2 and the reverse driving train 4-R.

The first speed driving train 4-1 comprises a first speed clutch 5 on the input shaft 2, a first speed driving gear 6 on the output side thereof and a first speed driven gear 7 meshed therewith and mounted on the output shaft 3. The third speed driving train 4-3 comprises a third speed driving gear 8 fixed to the input shaft 2, a third speed driven gear 9 meshed therewith and a third speed clutch 10 mounted on the output shaft 3 for connecting the gear 9 to the output shaft 3. The above arrangement is not especially different from a conventional one. According to this invention, a double-type clutch 11 having a front clutch mechanism and a rear clutch mechanism is provided on the input shaft 2 and the front clutch mechanism is used as a second speed clutch 12. Thus, the second speed driving train 4-2 comprises the second speed clutch 12, a second speed driving gear 13 on the output side thereof and a second speed driven gear 14 meshed therewith and mounted on the output shaft 3. The rear clutch mechanism of the double-type clutch 11 is used as a fourth speed clutch 15. The fourth speed driving train 4-4 comprises the fourth speed clutch 15, a fourth speed driving gear 16 on the output side thereof and a fourth speed driven gear meshed therewith and mounted on the output shaft 3.

The construction of the double-type clutch 11 itself is known, for example, in U.S. Pat. Nos. 2,943,503, 3,017,006 and 3,098,549.

Additionally, according to this invention, a reverse driving gear 18 is integrally connected to the fourth speed driving gear 16. The reverse driving gear train 4-R comprises the reverse driving gear 18 and a reverse driven gear 19 which is meshed therewith through an idler gear not illustrated. The driven gear 19 is mounted on the output shaft 3. In this case, the foregoing fourth speed driven gear 17 and the reverse driven gear 19 are supported rotatably on the output shaft 3. A selection mechanism 20 is provided to be movable between the two driven gears 17, 19 to select whether the fourth speed driven gear 17 is connected to the output shaft 3 in an ordinary case or the reverse driven gear 19 is connected to the output shaft 3 (the condition shown by dotted lines in FIG. 1) only in the case of the reverse driving.

In the illustrated example, a one-way clutch 21 is interposed in the first speed driving train 4-1 so as to be positioned between the first speed driven gear 7 and the output shaft 3 for absorbing any shock given by a change of speed between the first speed and the second speed. Further, a one-way clutch 22 is interposed in the third driving train 4-3 so as to be positioned between the third speed driven gear 9 and the third speed clutch 10 for absorbing any shock given by a change of speed between the second speed—the third speed—the fourth speed.

Further, in the illustrated example, a pair of inner and outer concentric first and second oil supply pipes 23, 24 are inserted in an axial opening of the input shaft 2. A third oil supply pipe 25 is inserted in an axial opening of the output shaft 3. These are provided to extend through the rear wall 1c of the transmission casing 1 so that the respective clutches 5;15,10 for the first, fourth and third speeds may be supplied with pressure oil through these oil supply pipes 23, 24, 25. Accordingly, the axial length of the oil supply means can become shorter than that of a seal ring type of one. For the second speed clutch 12, a seal ring type oil supply means using a seal ring 26 mounted on the input shaft 2 at its portion facing the third speed clutch 10 is adopted so that a pressure oil may be supplied thereinto from an oil supply opening 27 made in the input shaft 2. Thus, the oil passage length can be shortened and thereby the second speed clutch 12 can be tightened promptly when the oil is supplied thereinto. The engine braking effect caused by establishment of the second speed driving train 4-2 in downshifting can be improved.

Figure 2:
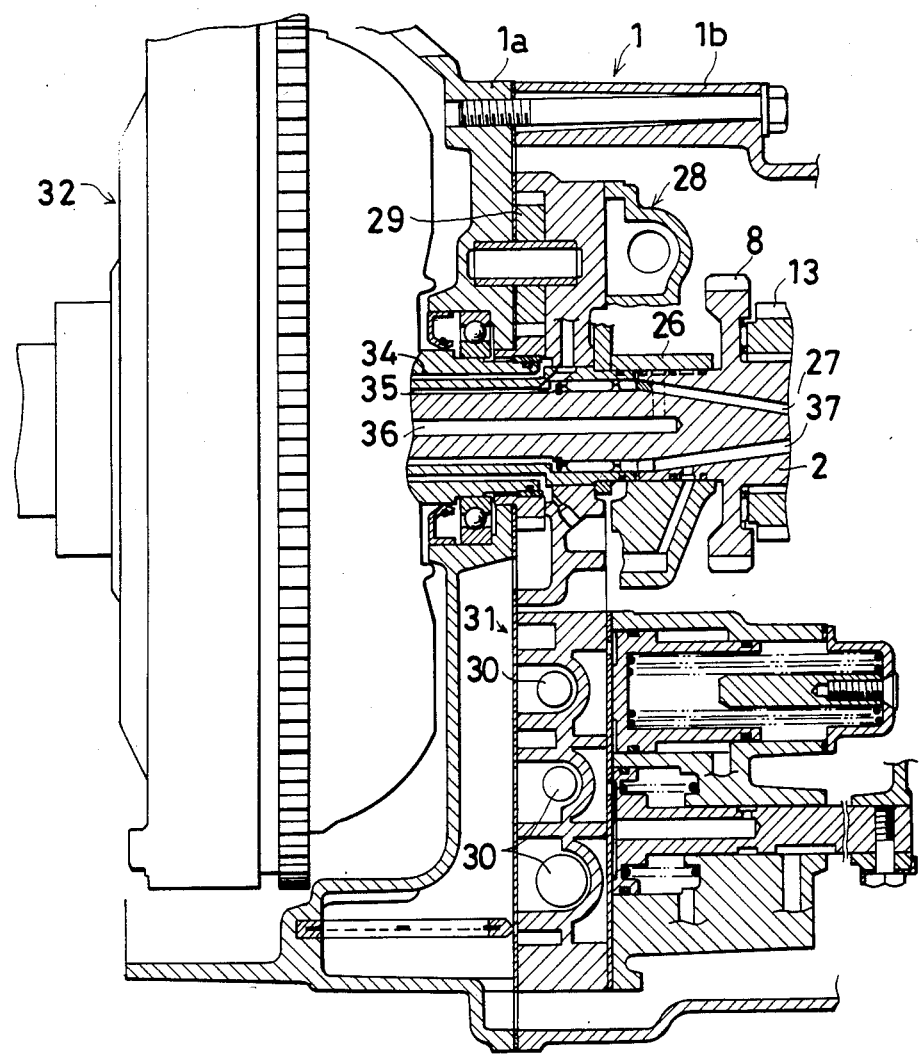
FIG. 2 is a sectional view taken along lines II—II of FIG. 1.
Figure 3:
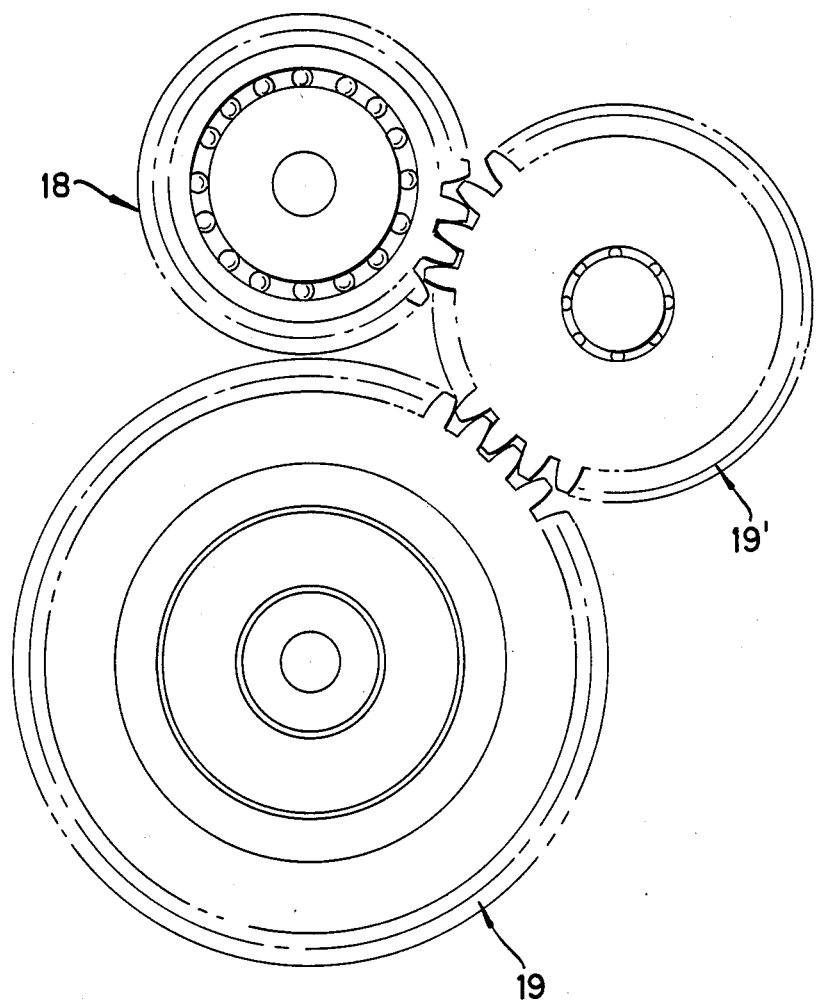
FIG. 3 is a sectional view taken along line III—III of FIG. 1.

Referring to FIG. 2, a block member 28 is attached to the front wall 1a. A gear pump 29 is also attached and serves as an oil pressure source. Respective control valves 30 for change speed control are also disposed on the front wall for constituting an oil supply means 31. In this manner, pressure oil may be supplied selectively therefrom to any of the foregoing oil supply pipes 23, 24, 25 and the oil supply opening 27.

Referring back to the FIG. 1, a torque converter 32 is provided on such a portion of the input shaft 2 that protrudes forwards from the front wall 1a so as to be interposed between the wall 1a and the engine. A direct-coupling clutch 33 is built in the same. An oil charge passage 34 connects between the interior space of the torque converter 32 and the oil supply means 31. Numeral 35 denotes an oil discharge passage thereof. An oil passage 36 is provided for the direct coupling clutch which is formed of an axial opening made in the input shaft 2 for connecting between a control chamber 33a of the direct coupling clutch 33 and the oil supply means 31. A lubrication oil passage 37 is made in the input passage 2 for the foregoing double-type clutch 11 and a bearing for the second driving gear 13. The lubrication oil passage 37 is connected to the oil discharge passage 35 from the torque converter 32 through an orifice member 38 so that lubrication of the double-type clutch 11 may be effected by the discharge oil from the torque converter 32.

Now the operation of the apparatus will be explained as follows:

If the respective clutches 5, 12, 10, 15 for the first speed to the fourth speed are selectively supplied with oil, the respective driving trains for the first to the fourth speed are selectively established. A forward driving at a speed selected from the first speed to the fourth speed can be effected. Additionally, if the fourth speed clutch 15 is supplied with oil and the selection mechanism 20 is changed over to the reverse side, the reverse driving train 4-R is established and a reverse driving can be obtained.

In this case, the driving gear 18, the idler gear and the driven gear 19 of the reverse driving train 4-R are rotated even at the time of establishment of the fourth speed driving train 4—4, but the rotation speed of the reverse driving gear 18 is limited to the rotation speed of the fourth speed driving gear 16 which is integral therewith, that is, the rotation speed of the input shaft 2. Additionally, in the case of establishment of any of the driving trains 4-1, 4-2, 4-3 for the first speed to the third speed, the reverse driving gear 18 is rotated by the rotation of the output shaft 3 through the fourth speed driven gear 17 and the fourth speed driving gear 16, but the rotation speed thereof is always limited to a speed lower than the rotation speed of the input shaft 2 owing to the relation between the gear ratio of the fourth speed driving trains 4-4 and that of any of the other driving trains 4-1, 4-2, 4-3 for the first speed to the third speed.

According to the foregoing conventional transmission apparatus, the reverse driving gear is integrally connected to the second speed driving gear in order that the second speed clutch may be used also as the clutch for the reverse driving train. In such a case, at the time of the high speed driving caused by the establishment of the driving trains of the third speed or the fourth speed, the reverse driving gear rotates at a higher speed than the speed of the output shaft, that is, a higher speed than that of the input shaft. According to the present invention, however, the rotation speed of the reverse driving gear 18 can always be limited to that lower than the rotation speed of the input shaft 2 and generation of engaging noises between the respective gears caused by a high speed rotation of the reverse driving train 4-R and a power loss caused by agitation resistance of the lubrication oil can be decreased as much as possible.

Thus, according to this invention, the double type clutch is used to constitute the respective clutches for the second speed and the fourth speed so that the transmission apparatus can become shorter in its axial length compared with an apparatus wherein a clutch for the fourth speed is independently provided. Additionally, according to this invention, the fourth speed clutch is used also for the clutch for the reverse driving train. The reverse driving gear is combined integrally with the fourth speed driving gear on the output side of the fourth speed clutch so that shortening of the axial length caused by omitting of the clutch used exclusively for the reverse driving can be achieved. Any disadvantage caused by a high speed rotation of the reverse driving train at the time of high speed driving can be removed.

It is readily apparent that the above-described transmission apparatus meets all of the objects mentioned above and also has the advantage of wide commercial utility. It should be understood that the specific form of the invention hereinabove described is intended to be representative only as certain modifications within the scope of these teachings will become apparent to those skilled in the art.

Accordingly, reference should be made to the following claims in determining the full scope of the invention.

What is claimed is:

1. A transmission apparatus comprising:
a casing having a front end defined by a front wall, a rear end defined by a rear wall and a middle wall dividing an interior of the casing into a forward portion and a rearward portion;
an input shaft extending longitudinally through the casing from said front wall towards said rear wall;
an output shaft extending longitudinally from said front wall towards said rear wall in parallel with said input shaft, both said input shaft and said output shaft being rotatably supported on said front wall and said middle wall;
a first-speed driving train for a low speed provided on said input and output shafts in said rearward portion of said casing between said middle wall and said rear wall;
a second-speed driving train for a middle speed provided on said input and output shafts in said forward portion of said casing and including a second-speed clutch on said input shaft;
a third speed driving train for a high speed provided on said input and output shafts in said forward portion forwardly of and adjacent to said second-speed driving train;
a fourth-speed driving train for a highest speed provided on said input and output shafts in said forward portion rearwardly of and adjacent to said second-speed driving train, said fourth-speed driving train including a fourth-speed clutch on said input shaft, a fourth-speed driving gear on said input shaft coupled to said fourth-speed clutch, and a fourth-speed driven gear rotatably supported on said output shaft and meshed with said fourth-speed driving gear, said fourth-speed clutch being a rearward clutch mechanism of a double-type clutch and said second-speed clutch being a forward clutch mechanism of said double-type clutch;

a reverse driving train for a reverse speed provided on said input and output shafts in said forward portion between said fourth-speed driving train and said middle wall, said reverse driving train including a reverse driving gear on said input shaft integrally connected to said fourth-speed driving gear on an output side of said fourth-speed clutch, an idler gear meshed with said reverse driving gear and a reverse driven gear rotatably supported on said output shaft adjacent said fourth-speed driven gear, said reverse driven gear being meshed with said idler gear; and selection means fixed to said output shaft between said fourth-speed driven gear and said reverse driven gear for selectively coupling one at a time of said fourth-speed driven gear and said reverse driven gear to said output shaft.

2. The transmission apparatus as claimed in claim 1 further comprising a torque converter and a direct coupling clutch provided forwardly of said front wall and operatively coupled to said input shaft.

3. The transmission apparatus as claimed in claim 1 wherein an oil supply means is mounted on said front wall in said forward portion, and said input shaft is provided in a forward end and a rearward end thereof with a pair of bores to supply oil directly to said double-type clutch.

* * * * *